B. P. HARRINGTON.
STALK CUTTER.
APPLICATION FILED MAR. 15, 1911.
1,000,262.
Patented Aug. 8, 1911.
2 SHEETS—SHEET 2.
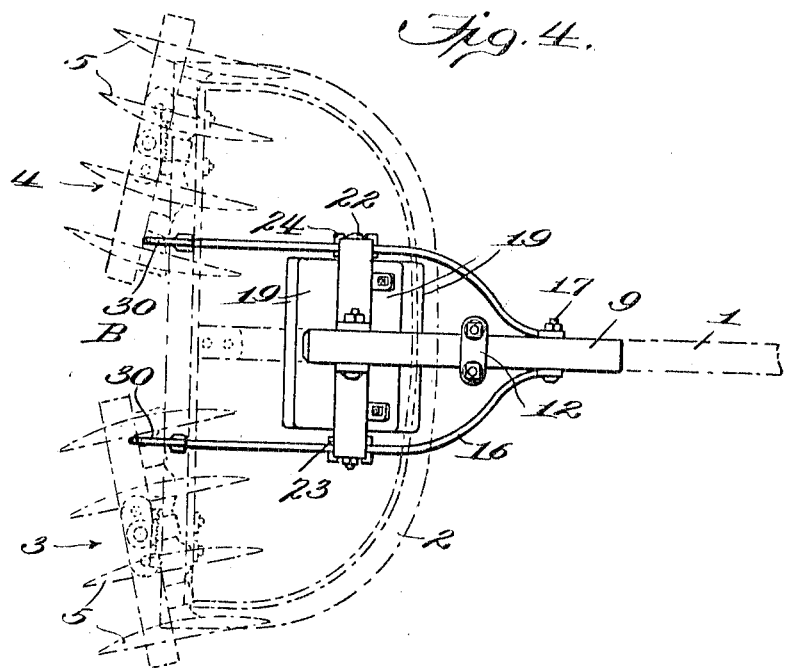
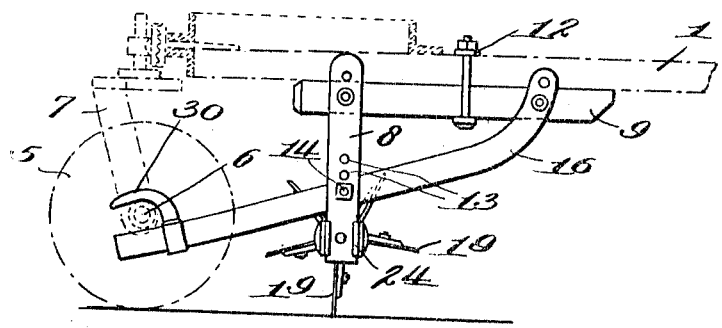

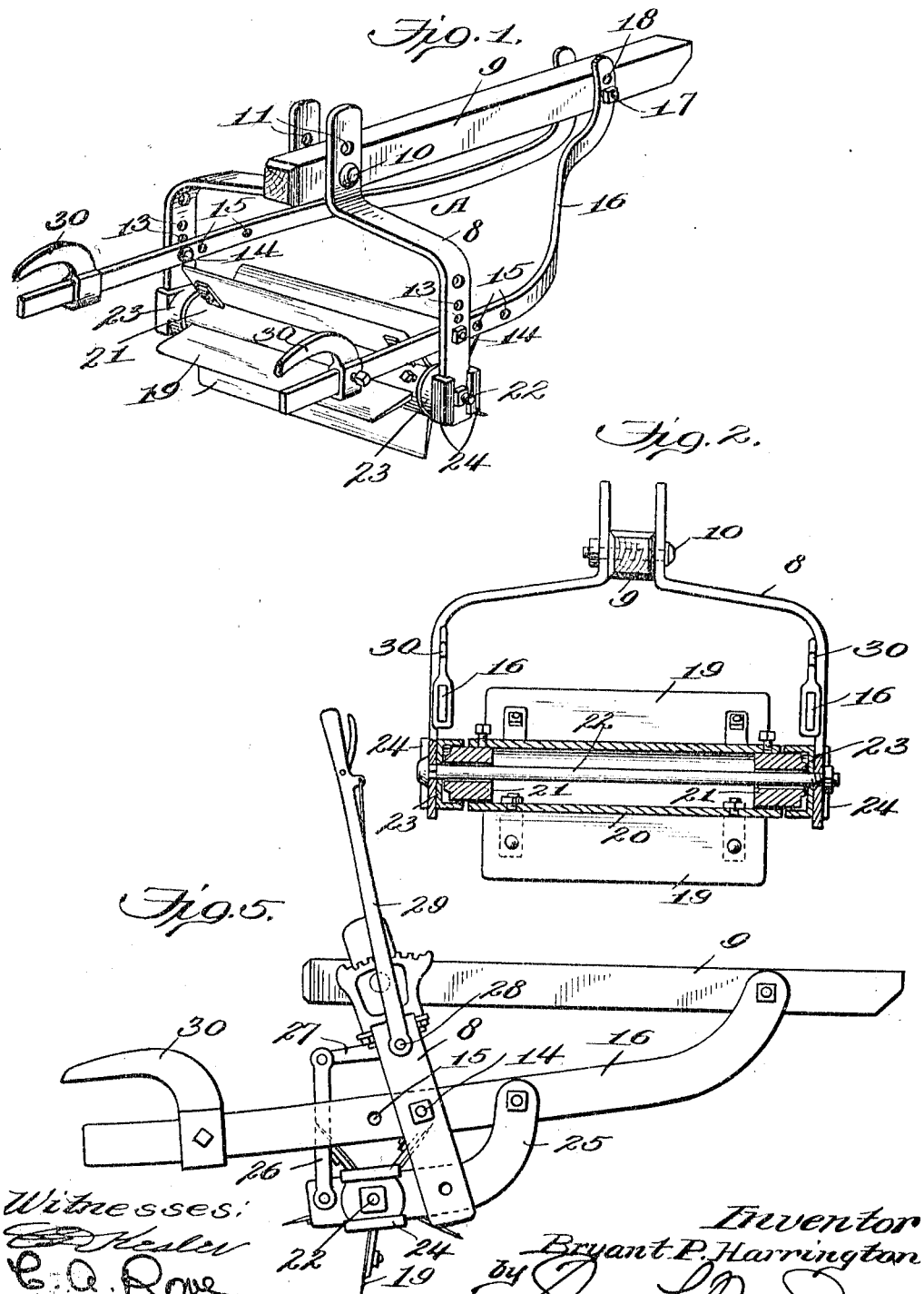

UNITED STATES PATENT OFFICE.

BRYANT P. HARRINGTON, OF MORVEN, GEORGIA, ASSIGNOR OF ONE-HALF TO WILLIAM T. GAULDEN, OF QUITMAN, GEORGIA.

STALK-CUTTER.

1,000,262.    Specification of Letters Patent.    Patented Aug. 8, 1911.

Application filed March 15, 1911. Serial No. 614,603.

*To all whom it may concern:*

Be it known that I, BRYANT P. HARRINGTON, a citizen of the United States, residing at Morven, in the county of Brooks and State of Georgia, have invented new and useful Improvements in Stalk-Cutters, of which the following is a specification.

The present invention has reference to improvements in stalk-cutters, and it comprehends an improved cutter designed primarily for attachment to a disk harrow between, and in front of the two series of disks, the cutter having a positive connection with the shafts on which the disks are mounted, whereby it is maintained in fixed position relative to said disks.

The invention further contemplates the production of a stalk-cutting attachment of the type specified which is susceptible of accurate bodily adjustment with respect to the beam from which it is suspended, so as to enable it to be brought into the desired position relative to said disks, as above stated, after the latter themselves have been adjusted in conformity to the particular strip of ground to be treated.

Finally, the said invention resides in certain details of construction of the component parts of the attachment, and in the specific connection and arrangement of such parts.

A structural embodiment of the invention is illustrated in the accompanying drawings, wherein—

Figure 1 is a perspective view of the improved stalk-cutter; Fig. 2 is a rear elevation thereof with parts in section; Fig. 3 is a side elevation of the stalk-cutter attached to a disk harrow, the latter being shown diagrammatically and partly in section; Fig. 4 is a plan view of Fig. 3; and Fig. 5 is a side elevation of a modification.

In said drawings, A designates in a general manner the invention proper, *i. e.*, the stalk-cutter *per se*, and B the machine or implement to which the cutter is attached, the said machine being here shown as a disk harrow of conventional type comprising the beam 1, the segmental frame 2 mounted thereon, and the two harrow sections 3 and 4 carried by said frame. The entire harrow is shown diagrammatically, as has been already stated, owing to its conventional construction, and requires no extended description beyond the fact that each of its two sections includes a series of disks 5 mounted on a shaft 6 which, in turn, is supported or journaled in a frame 7 suitably connected to the main frame 2, the arrangement being such that the said harrow sections may be adjusted relatively to frame 2 and to each other, to suit the particular field or strip of ground over which the machine is traveling.

The stalk-cutter A comprises primarily an inverted U-shaped frame 8 suspended from an auxiliary beam 9 and formed by a pair of bowed metal straps whose upwardly-bent inner ends are disposed against the side faces of said beam and adjustably connected thereto by a bolt 10 which passes through a transverse bolt hole in the beam and has its ends interchangeably engaged in the pairs of alining perforations 11 formed in said strap ends, the beam itself being disposed beneath and parallel with the main beam 1 and fastened to the same by a clip 12 or similar device, as shown in Figs. 3 and 4. The lower out-turned ends of the said straps are formed with alining perforations 13, or with longitudinal series of perforations, wherein are engaged a pair of bolts 14 which are also engaged in perforations 15 formed in the outwardly-bowed rear portions of a pair of braces 16 whose front ends are up-turned and connected by a bolt 17 to the front end of beam 9, said brace ends being likewise perforated, as indicated by the numeral 18. The several connections just described are, therefore, of such a nature as to permit frame 8 to be raised or lowered and, also, to be rocked to a slight extent upon bolt 10 as a pivot, and connected to the braces 16 at different points, owing to the formation of the perforations 15 in said braces.

The stalk-cutter proper, which, in the construction shown in Figs. 1 and 2, is located directly between the members of frame 8, consists preferably of a series of radial blades 19, arranged longitudinally of and fastened to a hollow cylinder 20 in whose ends are fitted a pair of heads 21 loosely mounted on a horizontal shaft 22. Each of said heads is, in turn, provided with a dust cap 23 which fits loosely thereon and is formed with a pair of clips 24 or the like arranged to engage the adjacent strap or frame member, whereby said caps are held against rotation. Shaft 22 projects at its ends through registering perforations in said caps and frame members.

Owing to the direct connection of the stalk-cutter to frame 8, the adjustment of the latter, as above described, will effect a corresponding vertical movement and also a slight lateral rocking movement, forward or backward, of said cutter. Where the construction shown in Figs. 1 and 2 is followed, the adjustment of said frame is effected by separately fitting the several bolts in the proper perforations, but, if preferred, the cutter may be detached from its frame and connected with a mechanism whereby it may be raised and lowered independent of any adjustment of said frame. In such instance, a pair of downwardly-curved arms 25, between which the cutter is disposed, are pivoted at their front ends to the braces 16 in advance of frame 8, and are engaged adjacent their rear ends by the clips 24 on the caps 23, as shown in Fig. 5, the rear ends of said arms being pivotally connected by links 26 to a second pair of arms 27 rigidly secured to a rock shaft 28 journaled in said frame. Shaft 28 is operated by a lever 29 fastened to one end thereof and held in adjusted position by a suitable pawl and rack mechanism. The two strap members which comprise frame 8 are formed with alining perforations, located above the series of perforations 13, wherein the ends of shaft 28 are received, and the swinging arms 25 are likewise formed with perforations through which the ends of shaft 22 extend.

The stalk-cutting attachment as a whole is disposed between and in front of the two harrow sections 3 and 4, and is designed to be connected directly to the same, so as to insure its being maintained in proper position relative to said sections during the time that the machine is in operation. To this end, there is slidably mounted upon the rear portion of each of the braces 16 a rearwardly-extending hook 30, or the like, held in adjusted position by any suitable means. These hooks are adapted to engage the inner end portions of the corresponding disk shafts 6, as shown in Fig. 3, the arrangement being such that the weight of the sections will be exerted directly upon said braces, and, consequently, upon the cutter, which latter is thus held against displacement and its blades caused to enter the soil to the same depth as the disks, it being understood that the adjustment of said cutter is effected subsequent to that of the disks and in correspondence therewith. The said sections, moreover, are so arranged that the front portion of the innermost disk of each section projects into the space between the rear portions of said braces. It will be seen, therefore, that when the machine is in operation, the cutter will act in advance of and between the harrow sections, and will thus effectually chop down the stalks in its path at the same time that the ground is being treated by the disks. Also the disks themselves take the place of the ground wheels ordinarily necessary in stalk-cutting machines and thus serve to perfectly support the cutting attachment. The adjustability of the various parts of the machine enables the disks to be set at any desired angle to each other and in any preferred position with reference to the main frame, and the cutter then positioned correspondingly. Finally, it may be stated that the attachment is susceptible of connection to and removal from the harrow.

I claim as my invention:

1. A stalk-cutting attachment for two-section disk harrows, comprising, in combination, a pair of pivoted members; a cutter located between and connected to said members; and adjustable means carried by each of said members for directly engaging the adjacent harrow section to hold the cutter in position relative to said sections.

2. A stalk-cutting attachment for two-section disk harrows comprising, in combination, a pair of pivoted members; a cutter located between and connected to said members; and a hook carried by each of said members for directly engaging the adjacent harrow section to hold the cutter in position relative to said sections.

3. A stalk-cutting attachment for two-section disk harrows comprising, in combination, a frame located between and in advance of the harrow sections; a cutter connected with said frame; a pair of braces connected to said frame and extending rearwardly beyond the same; and means carried by each brace and directly engaged with the adjacent section, for holding said cutter in position relative to said sections.

4. A stalk-cutting attachment for two-section disk harrows comprising, in combination, a pair of pivoted members; a cutter located between and connected to said members; and a rearwardly and upwardly extending hook adjustably mounted on each of said members and arranged to engage the adjacent harrow section to hold the cutter in position relative to said sections.

5. A stalk-cutting attachment for two-section disk harrows each of which sections includes a shaft and a series of disks mounted thereon, comprising, in combination, a cutter located between and in advance of the harrow sections; a pair of opposed supporting members for said cutter; a pair of opposed braces with which said supporting members are connected; and a hook carried by each brace adjacent the rear end thereof, said hooks being adapted for direct engagement with the inner ends of the shafts of the adjacent harrow sections, to hold the cutter in position relative to said sections.

6. A stalk-cutting attachment for two-section disk harrows comprising, in combination, a pair of opposed braces located between and in advance of the harrow sections and pivotally mounted at their front ends; a cutter located between said braces and connected with the same; and a member slidably mounted on each brace rearwardly of said cutter for engagement with the adjacent harrow section, to hold the cutter in position relative to said sections.

7. A stalk-cutter comprising, in combination a beam; a frame pivotally suspended therefrom and consisting of a pair of bowed members provided with alining perforations; a pair of rearwardly-extending braces pivoted at their front ends to said beam in advance of said frame and provided intermediate their ends with series of perforations adapted to interchangeably register with the corresponding first-named perforations; means engaged in said registering perforations for adjustably connecting said frame and said braces together; and a rotary cutter connected with said frame.

8. A stalk-cutting attachment for two-section disk harrows comprising, in combination, a beam; a frame pivotally suspended from said beam in advance of and between said sections, and consisting of a pair of bowed members provided with alining perforations; a pair of rearwardly-extending braces pivoted at their front ends to said beam in advance of the frame and provided intermediate their ends with series of perforations adapted to interchangeably register with the corresponding first-named perforations; means engaged in said registering perforations for adjustably connecting said frame and said braces together; a rotary cutter connected with said frame; and means carried by said braces and engaged directly with the adjacent harrow sections for holding said cutter in fixed position relative to the same.

In testimony whereof I have hereunto set my hand in presence of two subscribing witnesses.

BRYANT P. HARRINGTON.

Witnesses:
Rose M. Sefton,
James L. Norris, Jr.